(12) United States Patent
Venkataperumal et al.

(10) Patent No.: US 7,136,448 B1
(45) Date of Patent: Nov. 14, 2006

(54) MANAGING RECEIVED COMMUNICATIONS BASED ON ASSESSMENTS OF THE SENDERS

(75) Inventors: Ramesh Venkataperumal, Belmont, CA (US); Carl Keller, Danville, CA (US); Katherine H. Mobley, Honolulu, HI (US)

(73) Assignee: Siebel Systems, Inc., San Mateo, CA (US)

( * ) Notice: Subject to any disclaimer, the term of this patent is extended or adjusted under 35 U.S.C. 154(b) by 404 days.

(21) Appl. No.: 10/299,603

(22) Filed: Nov. 18, 2002

(51) Int. Cl.
*H04M 3/00* (2006.01)
*H04M 5/00* (2006.01)
(52) U.S. Cl. .............................. 376/265.02; 379/265.12
(58) Field of Classification Search ................ 379/265.01–265.14, 266.01–266.1
See application file for complete search history.

(56) References Cited

U.S. PATENT DOCUMENTS

| | | | |
|---|---|---|---|
| 6,333,980 B1* | 12/2001 | Hollatz et al. | 379/265.12 |
| 2001/0011228 A1* | 8/2001 | Shenkman et al. | |
| 2002/0004735 A1* | 1/2002 | Gross | |
| 2002/0067822 A1* | 6/2002 | Cohen et al. | |
| 2003/0055705 A1* | 3/2003 | Kilpatrick | |
| 2004/0054573 A1* | 3/2004 | Shah et al. | |
| 2004/0073508 A1* | 4/2004 | Foster et al. | |
| 2004/0138958 A1* | 7/2004 | Watarai et al. | |
| 2004/0193475 A1* | 9/2004 | Hemm et al. | |
| 2005/0102221 A1* | 5/2005 | Sulkowski et al. | |

OTHER PUBLICATIONS

Kramer & Associates Newsletter, "Using Technology to Support eBusiness Contact Centers," Kramer & Associates, Cincinnati, Ohio, 7 pages, http://www.crmxchange.com/whitepapers/pdf/technology.pdf (Oct. 18, 2002).

Covill, Randy, "Harvesting the Value from Customer Loyalty Programs," AMR Research, Inc., Boston, Massachusetts, 12 pages, Dec. 1, 2000, http://www.amrresearch.com/Content/view.asp?pmillid=13160&docid=484 (Oct. 18, 2002).

Covill, Randy, "Getting to Customer Profit With Customer Data Mining," AMR Research, Inc., Boston, Massachusetts, 9 pages, Mar. 1, 2001, http://www.amrresearch.com/Content/view.asp?pmillid=13490&docid=526 (Oct. 18, 2002).

Lieber, Ron, "More Firms Train Service Staff to Agressively Pitch Callers," *Wall Street Journal*, 3 pages, Jul. 30, 2002, http://online.wsj.com/article_email/0,,SB1027971729935212400,00.html (Oct. 10, 2002).

* cited by examiner

*Primary Examiner*—William J. Deane, Jr.
(74) *Attorney, Agent, or Firm*—Campbell Stephenson Ascolese LLP

(57) ABSTRACT

A method, system, and computer-readable medium is described for adjusting the service provided to customers or others contacting an organization (e.g., via a telephone call) based at least in part on the assessed value of the contacting party to the organization. In such situations, the organization assesses one or more aspects of the customer, such as a potential future value of the customer to the organization. After one or more such customer aspect assessments are available, the organization can adjust the service to be provided to the customer based on those assessments in various ways, such as by selecting one of multiple available human representatives as appropriate to respond to a received communication from the customer (e.g., based also on ratings of relevant capabilities of the representatives) and/or by selecting one or more appropriate offers to be made available to the customer.

27 Claims, 6 Drawing Sheets

MANAGING RECEIVED COMMUNICATIONS BASED ON ASSESSMENTS OF THE SENDERS

TECHNICAL FIELD

The following disclosure relates generally to handling received communications, and more particularly to using assessments of communication senders to assist in managing received communications, such as for a business to manage a telephone call received from a customer based on an assessed value to the business of the customer.

BACKGROUND

Historically, companies treated all customers equally in most situations, regardless of their relationship with the customers. Thus, for example, when a company was receiving telephone calls from customers (e.g., for technical support or to purchase new products/services), each customer would typically wait in the same queue of callers for the next available company representative, regardless of a customer's previous value or potential future value to the company. Some companies have taken limited steps to provide better service to some customers in such situations, such as by reducing the wait time for certain customers and/or by providing certain customers with distinct telephone numbers with which to contact the company to receive differentiated service. However, such existing techniques are limited in their effectiveness (e.g., in order to provide some customers with distinct telephone numbers for contacting the company, the company must identify those customers in advance and maintain additional infrastructure to provide the different communication channels).

Accordingly, it would be beneficial to provide enhanced techniques for tailoring the service provided to customers or others contacting an organization based on the value to the organization of the contacting party, such as to increase customer retention and maximize net revenues to the organization.

DETAILED DESCRIPTION

Figure 1:
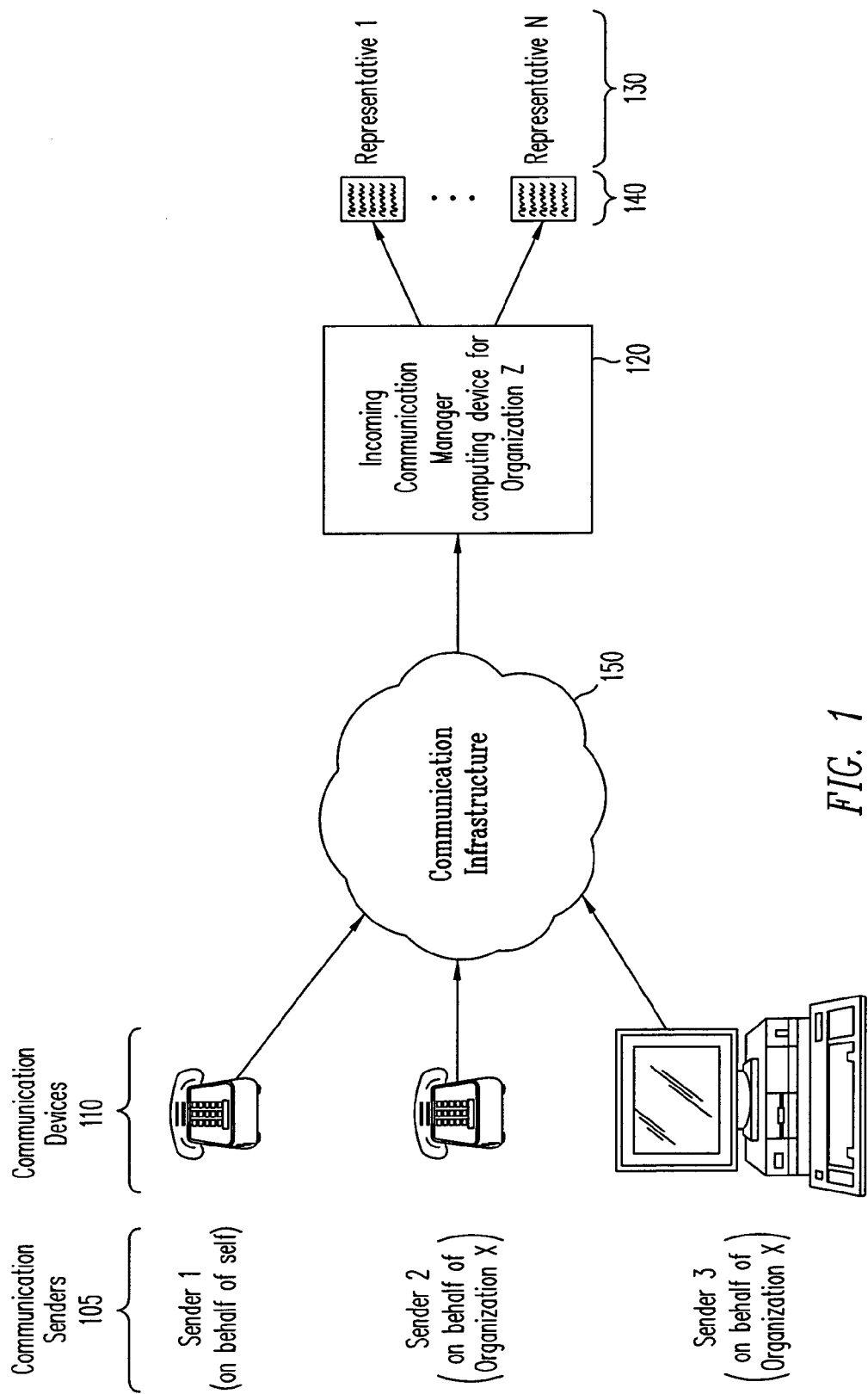
FIG. 1 illustrates an example of an organization managing incoming telephone calls from customers in a manner based on assessed values of the customers to the organization.

A software facility is described below that adjusts the service provided to customers or others contacting an organization based at least in part on the assessed value of the contacting party to the organization. In some embodiments, the contacting parties are customers (whether current or potential) that are placing telephone calls to the organization, such as to receive assistance or place an order, and the organization assesses various information about the customers to determine appropriate service to provide when responding to the telephone call.

The assessment of communication senders (e.g., telephone callers or senders of electronic communications such as email or instant messages) can be performed in a variety of ways, as discussed in greater detail below. In some embodiments, a variety of assessments regarding a communication sender can be made, such as of a potential future value of the sender to the organization and/or an ability/likelihood of the sender to pay for any purchased items (e.g., products and/or services, whether leased, rented, licensed, purchased outright, etc.). The assessed value of a sender to the organization may be based not only on likely future gross purchase receipts, but also factors such as likely profit margin and likely future costs (e.g., for providing future post-purchase service to the sender and/or based on a likelihood that the sender will return or cancel purchased items). For communication senders that are existing customers, a variety of additional assessments can be made based on their past interactions with the organization, such as various measures of their previous value to the organization, the previous cost to serve them, their current satisfaction with the organization, the likelihood of up-selling them to other items of more value to the organization, etc.

The communication sender assessments can be made in various ways (e.g., based on predictive modeling for future values, such as by using standard or organization-specific assessment rules), as discussed in greater detail below, and can be based on various information (e.g., publicly available information and/or information about the sender that was previously compiled by the organization, such as based on previous interactions with the sender). The assessments may also be made dynamically in response to a received communication and/or in advance of such a communication. In addition, when a communication sender is contacting the organization on behalf of another organization (e.g., in their role as a purchaser for the other organization), the sender assessments can be made for the sender as an individual and/or for the organization represented by the sender.

After one or more communication sender assessments are available, the organization can adjust the service to be provided to the communication sender based on those assessments in various ways. In particular, in some embodiments in which the organization has multiple human representatives that are available to respond to communications (e.g., multiple agents on a technical support line or sales lines), one (or more) of the human representatives are selected as being among the most appropriate to respond to a received communication from the sender based on the sender assessments. For example, each representative may be rated on one or more skills or capabilities (e.g., product knowledge, diagnostic skills, inter-personal skills, etc.) that affect their ability to effectively respond to received communications, and such ratings may be used in selecting an appropriate representative (e.g., by matching communication senders with the highest assessed value to the organization to the representatives having the highest ratings for capabilities to respond effectively). After an appropriate representative is selected, the representative is notified of the received communication so that they can respond, such as by routing the received communication to the representative.

In addition, a variety of other factors may also be considered in selecting an appropriate representative to respond, such as the type of received communication (e.g., telephone call vs. email), a reason for the communication (e.g., a problem with item XYZ, a desire to purchase an item of type LMN, a request for information regarding a specified topic, etc.), a length of time before which a particular representative will be available to respond, etc. Moreover, while in some embodiments a selection of an appropriate representative for a communication sender may be made in a manner based merely on the assessed values for the sender, in other embodiments the representative selection process may use additional information about the communication sender (e.g., previously determined preferences or demographic information) and optionally additional information about representatives in order to better match an appropriate representative with the sender.

In addition to (or instead of) selecting an appropriate representative to respond to a received communication, the organization can also adjust the service to be provided to the communication sender by selecting one or more appropriate offers to be made available to the communication sender based on the communication sender assessments. For example, the most attractive available offers (e.g., based on ratings of the offers) may be provided only to communication senders with the highest values to the organization. When multiple offers are selected for a communication sender, they may also in some embodiments be ranked in various manners (e.g., likely interest to the communication sender, most value to the organization, etc.). In some embodiments, various additional information about the sender can also be used to target offers to that sender, such as customer preference information, past item purchases, past offers made to the sender, past responses of the sender to offers made, etc. After one or more offers are selected and optionally ranked, one or more of the offers (e.g., the highest ranked) can then be provided to the communication sender in various ways. For example, if an appropriate representative has been selected to respond to the received communication, the representative can be informed of such offers and any relevant rankings so that the representative can make one or more of the offers to the sender as part of the response to the received communication.

For illustrative purposes, some embodiments of the software facility are described below in which specific types of assessments are made of customers placing telephone calls to an organization and are used by the organization in specific ways to adjust the service provided to those customers. However, those skilled in the art will appreciate that the techniques of the invention can be used in a wide variety of other situations, and that the invention is not limited to use with business organizations, with telephone calls, or with the illustrated types or uses of assessments.

As one example of managing incoming telephone calls and other communications from customers in a manner based on assessed values of the customers, consider the example illustrated with respect to FIG. 1. In the illustrated example, a variety of communication senders 105 are initiating communications to Organization Z via various communication devices 110. In particular, Senders 1 and 2 are each initiating telephone calls that are directed to Organization Z over a communication infrastructure 150 (e.g., the public switched telephone network), which are then directed to an Incoming Communication Manager ("ICM") computing device 120 for Organization Z. Similarly, Sender 3 is initiating an electronic communication to Organization Z via a personal computing device, whether a non-interactive communication to which a delayed response is acceptable (e.g., an email) or an interactive communication for which the sender will wait for a timely response (e.g., an instant message). The electronic communication is similarly forwarded to the ICM via a communication infrastructure, whether the same infrastructure used to forward the telephone calls or a distinct infrastructure.

The various communications to Organization Z may each be made for various reasons (e.g., technical support or to make a new purchase). In addition, the various communications may be made on behalf of the senders themselves being the customers (as is the case for Sender 1) or on behalf of another entity that the sender represents being the customer (as is the case for Senders 2 and 3, that each represent Organization X). References to a customer or to the sender of a communication should thus be considered to include the individual initiating a communication and/or an entity that the individual represents unless otherwise indicated.

After the ICM receives each of the incoming communications, it determines how to respond to the received communication in an appropriate manner based on the customer that sent the communication. In particular, in this example the ICM determines the identity of the customer (e.g., based on the telephone number from which the customer is calling, information contained within the communication itself such as from the header of an email, information provided by the customer after the ICM receives a communication such as from interactive selections made by a telephone caller in response to automated prompting, etc.), and may optionally identify a reason that the customer has sent the communication (e.g., based on the called telephone number, information contained within the communication itself such as from the header of an email, information provided by the customer after the ICM receives a communication such as from interactive selections made by a telephone caller in response to automated prompting, etc.). The ICM then retrieves various information about the customer (e.g., financial information, and for prior customers, customer profile information and information about previous interactions) if it is available.

If assessed values for one or more relevant types of information regarding the customer (e.g., a current or future value of the customer to Organization Z) are not already available (e.g., in stored customer profile information, such as based on a previous assessment that was recently made), the ICM then assesses values for the customer for those types of information (also referred to as aspects of the customer). The ICM then determines various types and/or levels of service to provide to the customer (e.g., when responding to the received communication) based on the assessed values.

In particular, in this example multiple representatives 130 of Organization Z are available to respond to the received communication, but have different capability levels in responding to such communications (e.g., based on training, amount of experience, assessed qualities such as cheerfulness or professionalism, etc.) and may also have different levels of availability (e.g., such as different wait times based on other communications that have previously been forwarded to them) and/or other relevant criteria (e.g., access to different types of communication devices or to relevant organizational information, or different levels of authority to provide various additional services to customers). The ICM will select an appropriate one of the representatives to respond to the received communication based at least in part on the assessed values of the customer (e.g., to select the most capable representatives for customers whose assessed values are highest with respect to a specified criteria of interest, such as value to Organization Z), and may also modify a default manner of responding based at least in part on the assessed values of the customer (e.g., to minimize or eliminate normal wait times for customers whose assessed values are highest, or to provide a most desirable type of response to such customers such as by responding with a live representative regardless of the form of received communication). In this example, the ICM retrieves various stored information about the currently available representatives (e.g., ratings of various relevant capabilities of the representatives) for use in the matching of an appropriate representative to the customer, selects a representative based on the assessed value information for the customer and the retrieved information for the selected representative (e.g., based on predefined matching rules), and then forwards the received communication to that representative for response.

In addition, in this illustrated example the ICM will also select one or more offers that are appropriate to provide to the customer based on the assessed value information about the customer, and will rank the selected offers if there are more than one based on a predefined criteria (e.g., assessed level of interest to the customer, value to Organization Z, etc.). At least one of the ranked offers (e.g., the highest ranked one) can then be provided to the customer as part of the response to them. In particular, in this example information regarding some or all of the ranked offers is provided to the representative selected to respond to the communication from the customer, such as by displaying it on a device 140 accessible to the representative. While the representative responds to this received communication, the representative can then make one or more of the offers to the customer (e.g., for a received telephone call, an offer can be made after the reason for the call has been addressed).

In this manner, received communications can be managed in a way that maximizes the value of the responses to Organization Z, such as by maximizing net revenue and enhancing the satisfaction of the most valuable customers. While communications of different types are received and managed in the same manner in this illustrated embodiment, in other embodiments only one type of communication may be handled in this manner (e.g., just telephone calls).

Figure 2:
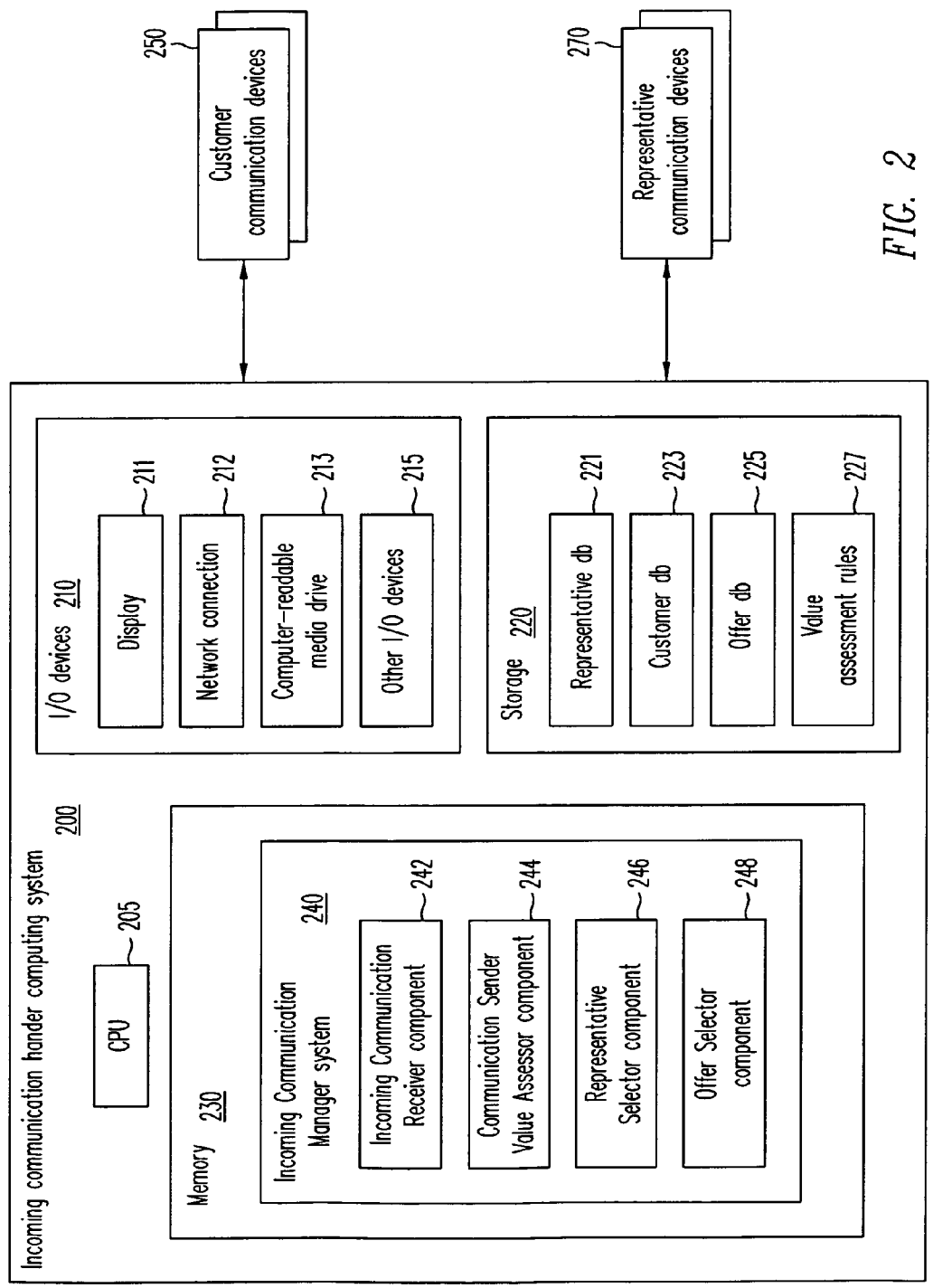
FIG. 2 is a block diagram illustrating an embodiment of a computing system suitable for providing the described techniques.

FIG. 2 illustrates a computing system suitable for executing an embodiment of an Incoming Communication Manager ("ICM") system facility capable of implementing the described techniques. In particular, an incoming communication handler computing system 200 is illustrated that manages incoming communications to an organization from senders based on assessed values to the organization of the senders, as well as various customer communication devices 250 (e.g., telephones) from which communications can be received and various representative communication devices 270 (e.g., telephones) to which the received communications can be forwarded for a response by representatives of the organization.

The incoming communication handler computing system includes a CPU 205, various I/O devices 210, storage 220, and memory 230. The I/O devices include a display 211, a network connection 212, a computer-readable media drive 213, and various other I/O devices 215. An embodiment of the ICM system 240 is executing in memory, and it includes an Incoming Communication Receiver component 242, a Communication Sender Value Assessor component 244, a Representative Selector component 246 and an Offer Selector component 248. Various other software modules (not shown) may also be executing in memory to provide functionality to users of the computing system, communication senders, and/or organizational representatives, such as an automated response module that answers incoming telephone calls (e.g., to provide information regarding a planned response, such as an estimated wait time, and/or to optionally gather information of use, such as an identity of the caller and/or a reason for calling). Various users may access the computing system, whether locally via the I/O devices 210 or remotely from a client computing device (e.g., via the World Wide Web, such as over an intranet and/or the Internet), such as to define various information used by the ICM system (e.g., organization-specific assessment rules to be used as part of determining customer value and/or organization-specific matching rules for selecting appropriate types or levels of service based on assessed values for a communication sender).

When an incoming communication is received from a customer or other communication sender, the ICM system first routes the communication to the Incoming Communication Receiver to identify the communication sender and to optionally identify a reason for the communication (e.g., based on interaction with automated response functionality). When performing an identification of a communication sender that is an existing customer of the organization, information regarding the customer may be retrieved and used from a customer information database 223 on storage (e.g., telephone numbers and/or email addresses used by the customer). In some embodiments and/or situations, an identity of a communication sender may not be able to be determined (e.g., for potential new customers), and in such cases the Incoming Communication Receiver may initiate the creation of a new customer profile to represent the communication sender.

Information regarding the customer (whether pre-existing or potential) is then provided to the Communication Sender Value Assessor component. The Communication Sender Value Assessor component then retrieves various information about the communication sender, such as from the customer information database and/or other publicly accessible information stores (not shown), and also retrieves various customer assessment rules 227 from storage. The assessment rules may be specific to this organization or instead common to multiple organizations, and can take a variety of forms as discussed in greater detail elsewhere. The Communication Sender Value Assessor component then uses the assessment rules to analyze the various information about the customer who sent the communication in order to generate one or more assessed values for various aspects of the customer, such as a value to the organization of the customer. In the illustrated embodiment, the one or more assessed values are then stored for the customer in the customer database for later use. While not illustrated here, in other embodiments the Communication Sender Value Assessor component could also interact with a third-party assessment engine (not shown) executing in memory 230 or elsewhere that assists with or performs some or all of the assessing for the customer.

After customer assessment information is available, one or more service response selector components will be invoked to determine types and/or levels of service to provide to the customer in response to the communication. In the illustrated embodiment, two service selector components are present, those being the Representative Selector component and the Offer Selector component, although in other embodiments only one of those components may be present and/or additional types of service selector components may be present (whether in addition to or instead of the illustrated service selector components).

In the illustrated embodiment, the Representative Selector component is provided with the customer assessment information (e.g., via the customer database), and the component retrieves various information regarding available representatives of the organization from the representative database

221 on storage. The retrieved information may include various information about capabilities of representatives that affect their ability to effectively respond to communications, such as ratings of various skill levels and amount of experience. The Representative Selector component then selects one of the representatives to respond to the customer based on the assessed information for the customer and the retrieved information regarding the representative. The selection of an appropriate representative can be made in various ways, such as by using mappings (not shown) of various assessed customer values to corresponding levels of capability of representatives or using representative selector rules (not shown) that more generally can consider a variety of factors in making a selection, and may optionally use other information regarding the customer (e.g., from the customer database) and/or the representatives as part of the selection.

In a similar manner to that of the Representative Selector component, the Offer Selector component in the illustrated embodiment receives information regarding the assessments of the customer and retrieves information about various possible offers to be made to the customer from an offer database 225 on storage. The Offer Selector component then selects one or more offers based on the assessed values for the customer as well as optionally on other information regarding the customer (e.g., from the customer database), and ranks the offers if more than one are selected. As with the selection of an appropriate representative, the selection of appropriate offers can be made in various ways, such as by using mappings (not shown) of various assessed customer values to corresponding offers or offer types or instead using offer selector rules (not shown) that more generally can consider a variety of factors in making a selection, and may optionally use other information regarding the customer (e.g., from the customer database) and/or the offers as part of the selection.

The information from the various service selector components can thus be used to determine a response to the customer that maximizes value to the organization. in the illustrated embodiment, the received communication will be forwarded to the selected representative for response, with the highest value of customers receiving the attention of the most capable representatives as soon as possible. In addition, the selected representatives will receive information about the selected ranked offers for the customers so that they can make one or more such offers to the customer as part of their response. As the representatives respond to the received communications, additional information regarding the customer can also be retrieved and stored for later use to assist in better targeting appropriate representatives and offers to the customer in the future (e.g., in response to a next received communication from that customer or as part of a later communication initiated by the organization to that customer), including indications of offers made and of responses to such offers, as well as preference and other information of the customer.

Those skilled in the art will appreciate that the computing system and communication devices 200, 250 and 270 are merely illustrative and are not intended to limit the scope of the present invention. In particular, a "system" or "device" may comprise any combination of hardware and/or software that can interact and perform some or all of the described functionality, including computers, network devices, internet appliances, PDAs, wireless or wired phones, pagers, electronic organizers, television-based systems and various other consumer products that include inter-communication capabilities. The devices and systems may also be connected to other devices that are not illustrated, including through one or more networks such as the Internet or via the World Wide Web. In addition, the functionality provided by the illustrated system components may in some embodiments be combined in fewer components or distributed in additional components. Similarly, in some embodiments the functionality of some of the illustrated components may not be provided and/or other additional functionality may be available.

Those skilled in the art will also appreciate that, while various items are illustrated as being stored in memory or on storage while being used, these items or portions of them can be transferred between memory and other storage devices for purposes of memory management and data integrity. Alternatively, in other embodiments some or all of the software modules and/or components may execute in memory on another device and communicate with the illustrated computing device via inter-computer communication. Some or all of the system components or data structures may also be stored (e.g., as instructions or structured data) on a computer-readable medium, such as a hard disk, a memory, a network, or a portable article to be read by an appropriate drive. The system components and data structures can also be transmitted as generated data signals (e.g., as part of a carrier wave) on a variety of computer-readable transmission mediums, including wireless-based and wired/cable-based mediums. Accordingly, the present invention may be practiced with other computer system configurations.

Figure 3:
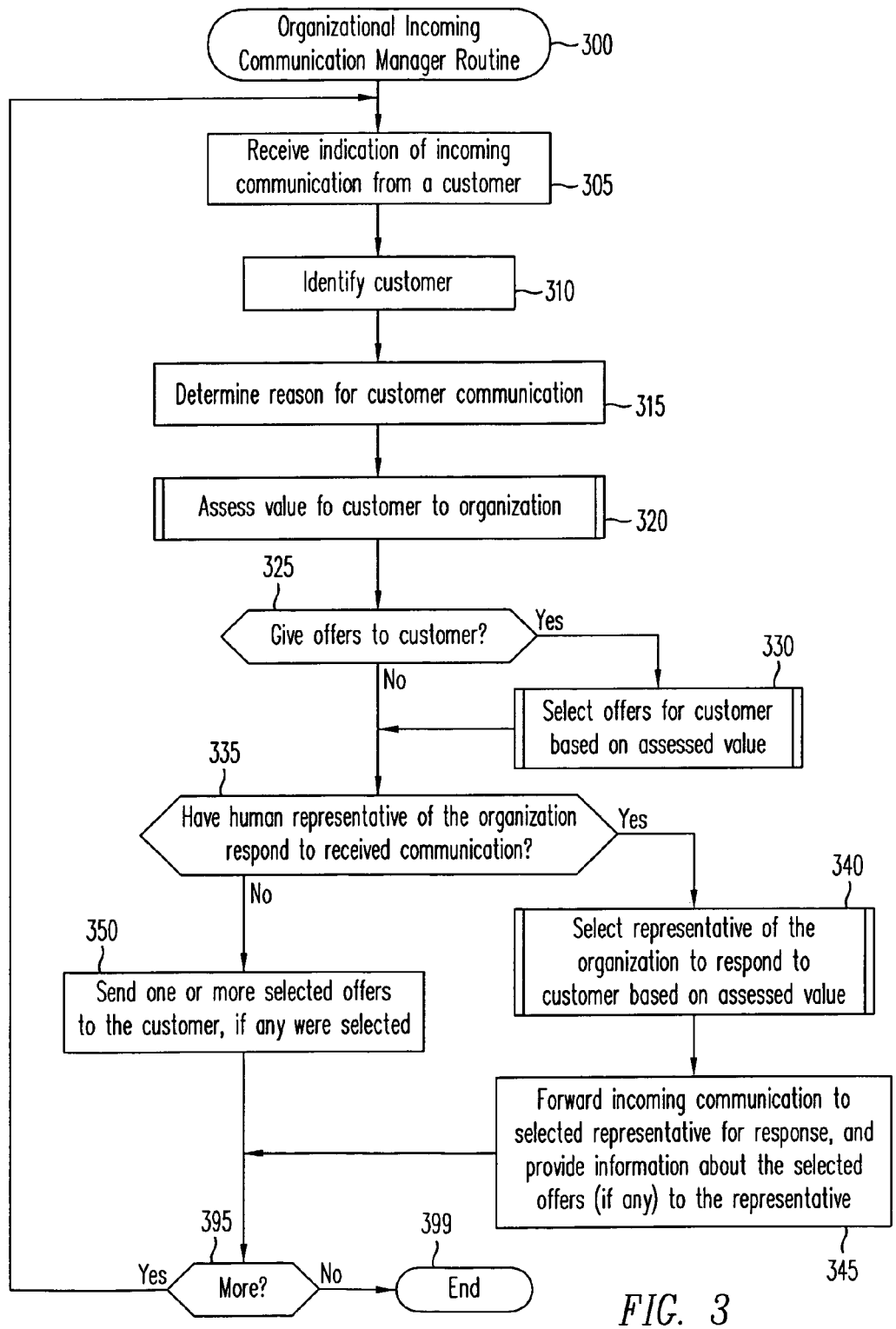
FIG. 3 is a flow diagram of an embodiment of the Incoming Communication Manager routine.

FIG. 3 is a flow diagram of an embodiment of an Incoming Communication Manager routine 300 for an organization. The routine receives incoming communications from customers of the organization, assesses values to the organization of the customers, and selects types and levels of services to provide to the customers in response to the received communications based at least in part on the assessed values.

The routine begins in step 305 where an indication is received of an incoming communication from a customer. In steps 310 and 315, the customer is identified and the reason for the communication from the customer is determined. As previously noted, this can be performed in a variety of ways based on the type of communication received. After step 315, the routine continues to step 320 to execute a subroutine to assess the value of the customer to the organization. The routine then continues to step 325 to determine whether or not to select offers to be provided to this customer, and if so continues to step 330 to execute a subroutine to select offers for the customer based at least in part on the assessed value of the customer.

After step 330, or if no offers were to be provided, the routine continues to step 335 to determine whether to select a human representative of the organization to respond to the received communication. If so, the routine continues to step 340 to execute a subroutine to select an appropriate representative of the organization to respond to the customer based at least in part of the assessed value of the customer, and then forwards the incoming communication to the selected representative for response in step 345. If offers were previously selected for the customer in step 330, information about the selected offers is also provided to the representative to use as part of the response. If it was instead determined in step 335 to not select a human representative, the routine continues instead to step 350 to, if any offers were selected for the customer in step 330, schedule one or more future communications to the customer to provide one or more of those selected offers. After steps 345 or 350, the routine continues to step 395 to determine whether to continue. If so, the routine returns to step 305, and if not the routine continues to step 399 and ends.

Figure 4:
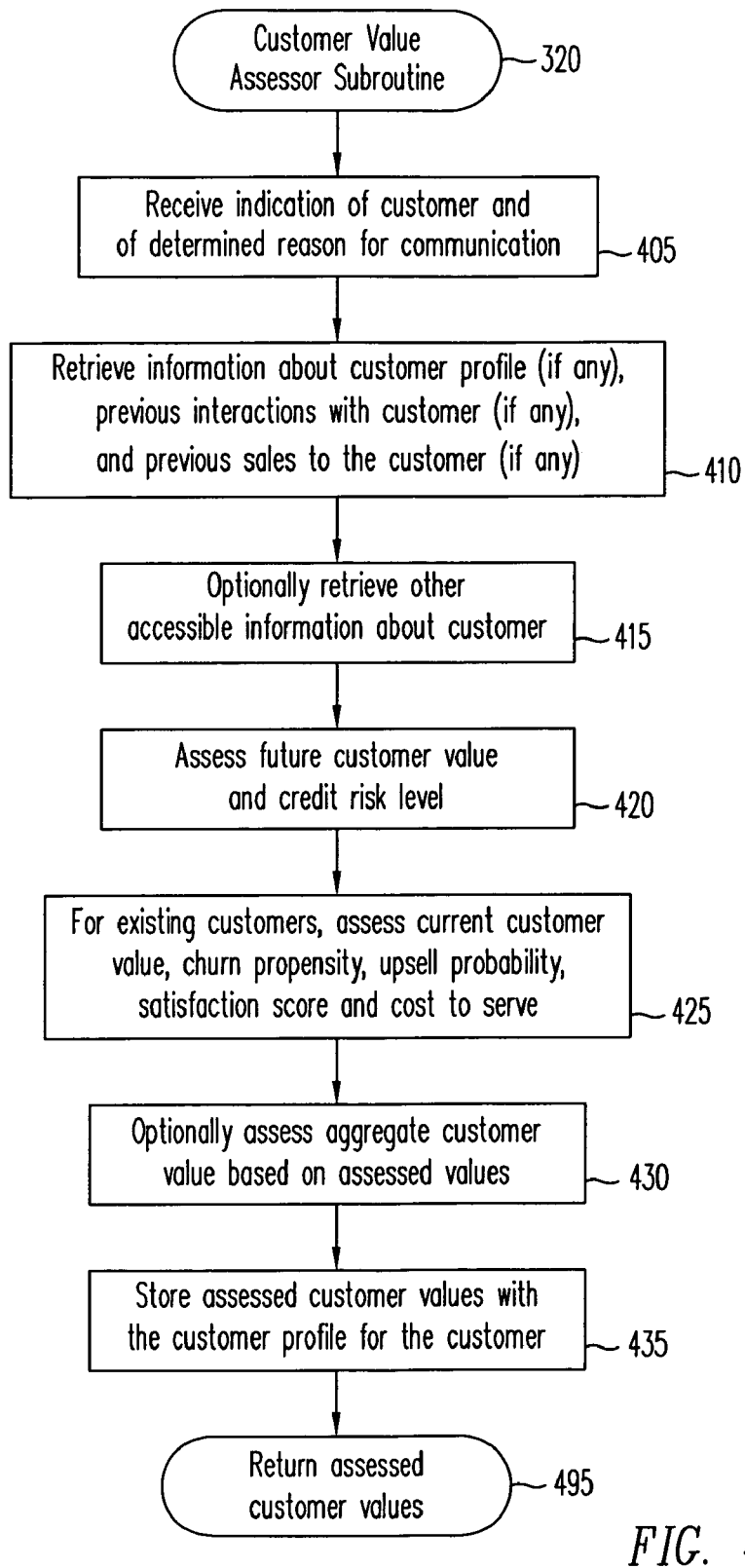
FIG. 4 is a flow diagram of an embodiment of the Customer Value Assessor subroutine.

FIG. 4 is a flow diagram of an embodiment of the Customer Value Assessor subroutine 320. The subroutine receives information regarding a customer and assesses values for various aspects of the customer including the value of the customer to the organization.

The subroutine begins at step 405 where an indication is received of the customer and optionally of a reason for a communication received from the customer. The subroutine continues to step 410 to retrieve information stored by the organization about the customer, such as from a customer profile for an existing customer and previous interactions with the existing customer (e.g., previous sales, service requests, etc.). In step 415, the subroutine then optionally retrieves other publicly accessible information (e.g., financial information, information about related items already purchased or contemplated by the customer, etc.) for the customer.

The subroutine then continues to step 420 to assess a future value to the organization of the customer, as well as a future level of credit risk of the customer. In step 425, the subroutine next assesses additional information related to existing customers of the organization, including a current customer value, a term propensity, up-sell probability, satisfaction score, and current costs to serve. The subroutine then continues to step 430 to optionally generate a single assessed aggregate value of the customer to the organization, such as based on the various other assessed values. The subroutine then continues to step 435 to store the assessed customer values with the customer profile for the customer, and then continues to step 495 to return the assessed customer values. Those skilled in the art will appreciate that a variety of other assessments could similarly be made, and that in some embodiments some of the illustrated types of assessments may not be performed.

As previously noted, assessments of aspects of customer can be performed in various ways. In some embodiments, various assessment rules are used to perform predictive modeling about the customer to generate assessed values regarding future activity or propensity, although in other embodiments some or all of the assessed customer information may instead be retrieved from various third-party sources (e.g., a credit risk level from a commercial credit-tracking organization). The assessment rules can have various forms (e.g., IF-THEN statements), and in the illustrated embodiment functionality is provided to allow an organization to define their own assessment rules. For example, IF-THEN assessment rules may be able to support complex nested structures, and define the criteria to satisfy for the rule using mathematical combination and comparison (e.g., addition, subtraction, multiplication, division, percentage, average, minimum, maximum, various set functions, sequence, ">", "<", "<=", ">=", etc.), and use Boolean comparison and connection operators (e.g., NOT EQUAL, NOT, AND, OR, LIKE, NOT LIKE, etc.). Assessment rules can also specify various outputs if the specified criteria is met, such as actions or activities to take, next steps in a process flow or branching, identifying of similar customers for research purposes, identifying of similar opportunities that have recently closed and why, etc. Assessment rules may also be able to invoke external routines, access stored objects and their fields, and otherwise interact with other computing infrastructure used by the organization. In addition, in some embodiments the assessment rule environment supports versioning of rules to allow changes to rules to be tracked and/or prevented, validation of rules to ensure proper syntax and variables are used, modularity so that rules can be reused, the scheduling of some or all of the assessment rules to be executed (e.g., periodically) to assess values for some or all existing customers, and an ability to test a rule without affecting current customers and representatives. In addition, each rule may have a start and end date during which it is effective, as well as other criteria to determine when the rule may apply.

A variety of information about a customer may be used by the assessment rules, such as age, education, income, job title, associated entity that they represent and years at that entity, address information, marital status, average purchase size, current purchase volume, potential purchase volume, the percent of income of the customer that the organization estimates they will spend with them (also referred to as "target share of wallet"), estimated customer lifetime, etc. For customers that are businesses, information to be used by the assessment rules may further include when they were founded, annual revenue, revenue growth rate, total number of employees, related entities (e.g., a parent account), profitability, credit risk level, etc.

Examples of various aspects of customers that can be assessed, as well as examples of how values can be calculated for those aspects, include the following:

Customer Lifetime Value (LTV) ($)—a combination of the customer's current value score and the customer's potential value score less the costs associated with that customer. It can be determined by: Current Value Score (%)+Potential Value Score (%)−Customer Costs.

Customer Costs—costs can be tracked for customers in various areas, such as sales costs, service costs, marketing costs, fulfillment costs (orders), external costs (all other). Service costs may include the following variables: average cost per call per minute, average cost per inbound email, average cost per inbound web chat per minute, average cost per fax, and cost per representative minute. The average cost per call per minute can be estimated by: call cost=sum of (call—inbound, call—outbound, and call activity duration) *average cost per call/minute; the average cost per inbound email can be estimated by: email cost=# of (email—inbound, email—outbound) activities*average cost per email; the average cost per inbound web chat per minute can be estimated by: web chat cost=sum of web—inbound activity duration*average cost per web chat/minute; the average cost per fax can be estimated by: fax cost=# of (fax—inbound, fax—outbound) activities*average cost per fax; and the average cost per representative minute can be estimated by: sr cost=time to resolve*customer support representative cost per minute Current Value Score ($)—identifies the customer's value to the company based on how much the customer has spent with the company and the frequency of purchase. This score can be determined by information on the customers' orders, such as by summing the order Item Total for each order where the payment status indicates that the customer has been charged.

Potential Value Score ($)—identifies the customer's potential or future value to the company. It could be based on the percentage of value that the company derives from the customer today or based on the expected total value the customer will have over time. This score is determined by the following factors: Potential Value for individual=if age<35 then [(Target Share of Wallet)*Income]+[Target Share of Wallet*Expected Future Income] OR if age>35 then [(Target Share of Wallet)*Income]; and Potential Value for business=[(Target Share of Wallet)*Annual Revenue]+ [Target Share of Wallet*(1+Revenue Growth Rate)^Ave Customer Lifetime]. Expected Future Income reflects the expected increase in income over the customer's lifetime, and can be estimated to be Income*(1+education rate)^Average Customer Lifetime. A default of 10 years can be used in the illustrated embodiment for Average Customer Lifetime if more detailed information is not available.

Churn Score—this is the customer's propensity to discontinue service, which is often of interest in the telecommunications and energy industries. It can be determined by: Churn Score=[(number of moves in past year*wt)+(if homeowner=yes then 1*wt*(−1))+(number of open SR's past due*wt)+(total service requests where close date>commit date*wt)+(total number of SR's*wt)], and may in some embodiments be determined only for individuals. The number of moves in the past year can be determined in various ways, such as when the customer's address/zip code changes. The various "wt" variables are weightings to give to the various elements, and they should add up to 100% total.

Up-sell/Cross-sell Score—this is the customer's propensity to purchase additional items. It can be determined by: Up-sell score=[(satisfaction score*wt)+(customer time period*wt)+(frequency of purchase*wt)+(average # of line items/order*wt)+average order size &*wt)]. The Customer Time Period indicates how long the customer has been a customer, and the frequency of purchase can be determined by: frequency of purchase=total orders/last order date−first order date (order/day). The various "wt" variables are weightings to give to the various elements, and they should add up to 100% total.

Credit Risk Score—this identifies the customer's ability and reliability to pay for service, and in some embodiments is provided by a third-party service (e.g., credit tracking service for individuals, and Dun & Bradstreet for businesses).

Satisfaction Score—this identifies the customer's current satisfaction level with the organization. This score is derived by feedback from the customer and/or feedback from the representatives. Customer feedback can be obtained in various ways, such as from customer relationship and transactional surveys. It can be determined by: Customer Satisfaction Score for a time period=average across surveys [Customer Loyalty Indicator per survey−((sum of gaps>2) *wt per survey)]+sum(customer experience for an activity). The customer experience for an activity can be given a value of "5" when they are very satisfied, "3" when they are satisfied, and "0" when unsatisfied. The Customer Loyalty Indicator (CLI) may be derived from certain questions on a survey and used to track a customer's loyalty, and can be determined by: (continue purchasing (Y/N)+recommend the company (Y/N)+actions in the next year (purchase, upgrade, nothing, etc)+direction consistent (Y/N)), with the outcome being a number between 0 and 10, and with a customer answer of Yes treated as a value of "2.5" and an answer of No as "0". The default time period is 3 months in the illustrated embodiment, but in some embodiments the customer may modify the time period.

Those skilled in the art will appreciate that the various aspects of customers that can be assessed and examples of how values can be calculated for those aspects is provided for illustrative purposes only, and that other aspects can be assessed (whether instead of or in addition to these aspects) and that these aspects can be assessed in other ways.

Figure 5:
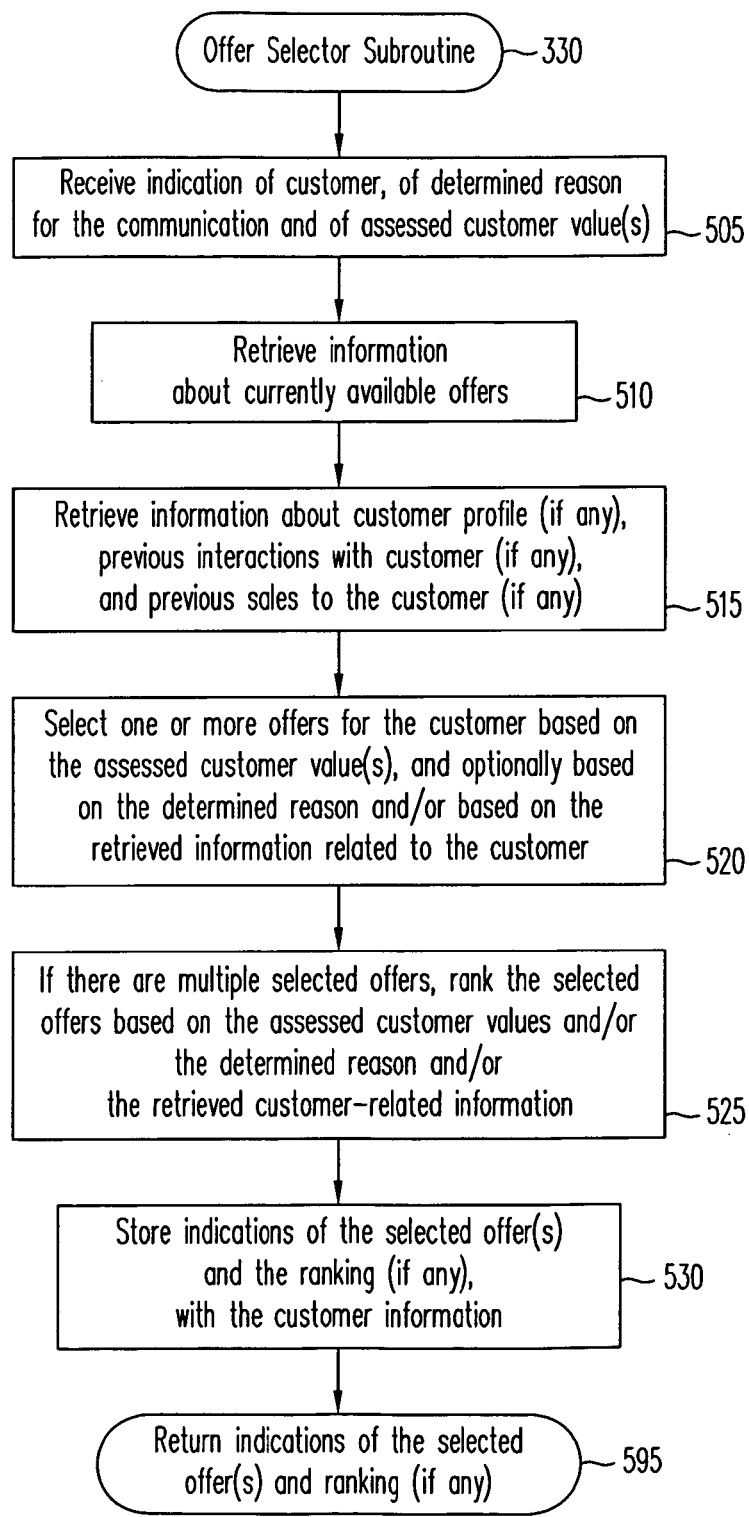
FIG. 5 is a flow diagram of an embodiment of the Offer Selector subroutine.

FIG. 5 is a flow diagram of an embodiment of the Offer Selector subroutine 330. The subroutine receives information about assessed customer value to the organization, and selects one or more appropriate offers to be made to the customer based at least in part on the assessed value.

The subroutine begins at step 505 where an indication is received of the customer and of assessed customer information, as well as optionally of a determined reason for a communication received from the customer. In other embodiments, the subroutine could instead retrieve the assessed customer information and/or the determined reason for the communication from stored information about the customer (e.g., the customer profile). The subroutine then continues to step 510 to retrieve information about currently available offers, and in step 515 retrieves various information about the customer in a manner similar to that of steps 410 and 415 of FIG. 4. The retrieved information can include a variety of information about the offers, such as ratings of the relevance and/or interest of the offers to various types of customers.

In step 520, the subroutine then selects one or more offers for the customer based at least in part on the assessed customer information, and optionally based on the reason for the communication and/or based on the additional retrieved information related to the customer. In some embodiments, each offer is fully specified and the selection process merely selects among them, while in other embodiments offers may include variable components (e.g., price, duration, etc.) and the selection process may include selecting an appropriate value in the allowable range for that offer. After step 520, the subroutine continues to step 525 to, if there were multiple offers selected in step 520, rank the selected offers, such as based on the assessed customer value information and/or the determined reason for the communication and/or the retrieved customer-related information. In step 530, the subroutine then stores indications of the selected offers and their associated ranking (if any) for the customer (e.g., with the customer profile), and then continues to step 595 to return indications of the selected offers and their ranking.

Figure 6:
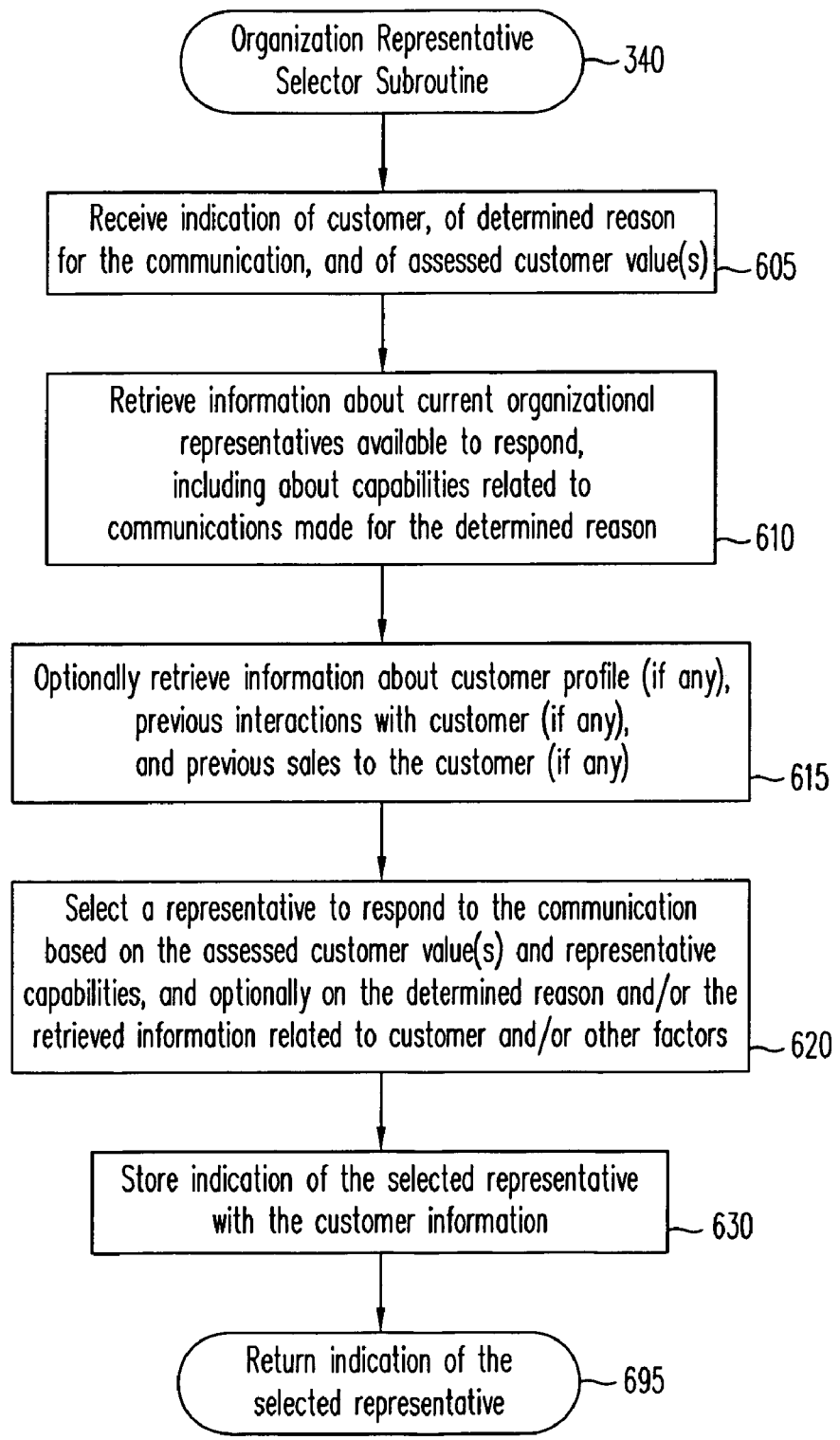
FIG. 6 is a flow diagram of an embodiment of the Organization Representative Selector subroutine.

FIG. 6 is a flow diagram of an embodiment of the Organization Representative Selector subroutine 340. The subroutine receives an indication of assessed value information for a customer, and selects an appropriate representative to respond to a communication received from the customer based at least in part on the assessed value information.

The subroutine begins in step 605 where an indication is received of the customer and of assessed customer value information, as well as optionally of a determined reason for a communication received from the customer. In other embodiments, the subroutine could instead retrieve the assessed customer value information and/or the determined reason for the communication from stored information about the customer (e.g., the customer profile). The subroutine then continues to step 610 to retrieve information about current organizational representatives that are available to respond to the communication from the customer. The retrieved information can include a variety of information about the representatives, including information about capabilities of those representatives relevant to their effectiveness in responding to communications. In some embodiments, the information about the capabilities will include ratings of the effectiveness of the representatives in responding to communications of different types, communications made for different reasons, etc. The subroutine then continues to step 615 to optionally retrieve various information related to the customer in a similar manner to that previously described with respect to steps 410 and 415 of FIG. 4.

After step 615, the subroutine continues to step 620 to select a representative to respond to the communication received from the customer based at least in part on the assessed customer value information and information regarding the appropriateness of the selected representative, as well as optionally on a determined reason for the communication and/or the retrieved information related to the customer and/or information about the representative other than capability information and/or other factors (e.g., current wait times for particular representatives, customer preferences, etc.). After step 620, the subroutine continues to step 630 to store an indication of the selected representative for the customer (e.g., with the customer profile), and the subroutine then continues to step 695 to return an indication of the selected representative.

As previously noted, the representative selection can be made in a variety of ways. For example, in some embodiments various selection rules can be used (e.g., if the Customer Lifetime Value score>=$100k dollars, then route to next available representative that has advanced or intermediate capabilities; if Customer Lifetime Value<$5k AND >$100k AND the Churn Score is high then route to a representative with advanced capabilities; if Customer Lifetime Value score>=$5k AND Customer Satisfaction Score is medium then route to a representative with novice capabilities and put at the end of their wait queue). Those skilled in the art will appreciate that these selection rules are provided for illustrative purposes only, and that other selection rules can be assessed (whether instead of or in addition to these rules) and that representative selection can be performed in other ways.

As previously discussed, the described techniques can be used by an organization to provide a variety of benefits. Examples of scenarios in which the techniques can be of benefit are provided below. Those skilled in the art will appreciate that these scenarios are provided for illustrative purposes only, and that the described techniques can be used in other scenarios (whether instead of or in addition to these scenarios) and that the managing of customers within a scenario based on the described techniques can be performed in other ways.

Churn Scenario

Customer Jones has contacted customer service to discuss a problem on his account. A large number of cellular calls he places are dropping, and he is unhappy about it. When Mr. Jones called customer service, his phone number was matched against his account number, and subsequently his account was examined real-time by a predictive modeling software application. While Mr. Jones waited to speak to a representative, his account profile was updated to reflect new predictive modeling scores. These newest scores indicated Mr. Jones had a high churn score (Churn score=9), and a high customer lifetime value score (Customer Lifetime Value=$1,000,000). Using these scores, a set of related offers were generated and made available to the organizational representative that responds to the call. The representative notes Mr. Jones' concerns, and submits a service request to the Technical Quality Assurance department to monitor the service level of the area in which Mr. Jones lives. The representative also notes the system's determination that Mr. Jones not only has a high propensity to churn, but also has a high lifetime value. When speaking to Mr. Jones, the representative uses the list of ranked offers to offer Mr. Jones a special rate plan for those customers it wishes to keep who live in fringe service areas, and Mr. Jones accepts the first offer given to him.

Upsell Scenario

John Jones, a software salesman and a valuable cell phone customer, calls his mobile phone company about a problem on his bill. An automated voice answers and asks him to select the area he is calling about. He selects the billing question option. Next the system asks him to enter his account number to expedite service. Just after he enters his number a voice comes on the line and explains that as a valuable customer his call is of the highest priority and that he will be routed to a representative as quickly as possible. After that, another quick message begins which explains that as a high volume user he may appreciate the new service plans that are available including unlimited minutes for $250 per month. The message completes and his call is routed to a representative who picks up and says, "Good afternoon Mr. Jones, I understand you have a billing issue, how can I help you today." The representative, Tanya Miller, is experienced and has reached a high level of certification and hence handles the most important class of customers. As she picks up the call she can see on her customer dashboard that Mr. Jones' customer value score is very high, his churn score is medium, his service level is high, and his up-sell propensity is moderate to high. She picks up the call and begins the service portion of the call. Tanya is very knowledgeable and helpful and answers John's billing question quickly and easily. She then asks John if he would be interested in learning more about the new service plans and easily explains the advantages and features of the new plan that might be best for him. John is interested and immediately signs up for a one-year contract with unlimited service. A week later, John is interested to see if his new plan has taken effect, so he goes to the website for his mobile phone provider. As he is about to login he notices several ads for service plans and phones on the page including the service plan he just signed up for last week. Since he wants to check his plan information he logs into his web account. He is immediately taken to his personalized homepage where he can access his bill, information about his phone and service plan. He accesses the information about his plan and sees that his new plan is in effect. He notices a small advertisement in the upper right of the screen for a newer and smaller phone. He clicks on the ad and is taken to a larger page where he can see a larger picture of the phone and view the price and other details. The phone is not exactly what he is looking for, so he returns to the homepage. He notices that there is a featured and personalized offers area on the screen, which gives him access to special offers and new services. He sees offers for a new equipment replacement plan and for a couple of new phones other than the one he just looked at. He selects the equipment replacement plan text and is taken to a full-page explanation. He likes the offer and goes ahead and purchases the plan.

Behind the scenes, a list of offers was dynamically generated for John based on his current profile information in the database as well as any information passed in from the automated response functionality. The system checks all the available offer criteria against John's profile and dynamically determines the set of offers for which he qualifies. The list is sorted by his propensity to purchase and the voice message for the top offer is played to the customer. At the same time, because John is a valuable customer he is routed to a highly skilled representative who can not only solve his problem but can also sell him this new service. The representative takes care of John's issue and notes his scores and preferences on the customer dashboard. The representative clicks the offer button and is taken into a smart script, which guides her through the sale of the unlimited minutes offer.

Because no significant information has changed in John's profile, the offers that were generated previously are reused and the unlimited minutes plan is the best offer. The smart script clearly enumerates the advantages of the plan and John accepts the offer. A week later, John goes to the website and sees a list of offers. Because John just took advantage of a new service plan, the best offer initially generated for him was for a new phone. John looked at that offer and did not accept or even go to the more information link, so it is determined that he is not interested in that offer. When he returns to the homepage, a new list of offers is generated based on his profile as well as the new click stream information just gathered. The best offer is now the equipment protection plan and for some other phones that might be more interesting given his lack of interest in the other phone. John clicks through and purchases the equipment protection plan. Because he purchased the plan he will not be offered the equipment protection plan by any call center representative or see it as a web offer again.

Satisfaction Increase Scenario

A customer called in recently and filed a complaint regarding the amount of the bill. The representative taking the call documented the complaint, researched the issue while the customer was on-line and determined that the customer's usage patterns changed dramatically and they were no longer on the most cost-effective rate plan. After switching the customer to the new rate plan free of charge and explaining the different plans based on customer usage patterns, the representative closed out the complaint, noting the customer satisfaction level as low. During a batch analysis of the customer satisfaction levels across certain customer segments, this customer was identified as a high-value customer (by a Customer Lifetime Value score generated by the predictive modeling software application) with a low customer satisfaction level, which required a follow-up to ensure customer dissatisfaction is improving. The system automatically queues up a contact request with an outbound representative. The representative reviews the notes from the last customer contacts including the complaint details and contacts the customer to inquire about the satisfaction with the new rate plan. In addition, the system generated a contact request to include a free pass to a movie premiere showing local to the customer in their next bill statement.

Those skilled in the art will also appreciate that in some embodiments the functionality provided by the routines discussed above may be provided in alternative ways, such as being split among more routines or consolidated into less routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A method for a computing system of a business to manage telephone calls from customers based on assessed values of the customers to the business, the method comprising, for each of multiple incoming telephone calls that are each from one of multiple customers of the business:

before transferring the incoming telephone call from the customer to one of multiple human representatives of the business, identifying the customer and a reason that the customer is calling;

assessing a future value to the business of the customer based at least in part on information specific to the customer;

receiving for each of the human representatives a rating of capabilities for responding to telephone calls made for the identified reason; and selecting one of the human representatives to respond to the incoming telephone call based on the selected representative having a capabilities rating that is appropriate for the assessed future value of the customer;

transferring the incoming telephone call to the selected representative;

identifying one or more offers from the business to be made to the customer based at least in part on the assessed future value of the customer;

ranking the identified offers based on a specified criteria; and providing information regarding the identified offers to the selected representative so that the representative can make the offers to the customer, wherein the providing of the information to the selected representative includes providing information regarding the ranking to the selected representative so that a highest ranked of the offers will be made to the customer by the selected representative.

2. The method of claim 1 wherein the assessing of the future value of the customer to the business includes analyzing information retrieved from a stored profile of the customer and retrieved information regarding prior interactions between the customer and the business.

3. The method of claim 1 wherein the assessed future value of the customer to the business is based on assessed aspects of the customer that include an assessed churn score reflecting a propensity of the customer to discontinue or return purchased items, an assessed up-sell score reflecting a propensity of the customer to purchase additional items, an assessed credit risk score identifying an ability and reliability of the customer to pay for purchased items, and an assessed satisfaction score that identifies a current satisfaction level of the customer with the business.

4. The method of claim 1 wherein the selecting of the human representative having a capabilities rating that is appropriate for the assessed future value of the customer includes identifying representatives who will enhance satisfaction of customers having high future values, so that the representatives selected for such customers will be one of the identified representatives.

5. The method of claim 1 including selecting a manner of responding to at least some of the incoming telephone calls that is distinct from a default manner of responding, the selecting of the distinct response manner based at least in part on the assessed future values of the customers placing those calls, and wherein the transferring of those incoming telephone calls to the selected representatives for those calls and/or making of offers to those customers by those selected representatives are performed in the distinct response manner selected for those calls.

6. The method of claim 1 wherein the identified reason for one of the incoming telephone calls from a customer relates to problems with an item previously purchased by the customer from the business, wherein the capabilities of the selected representative for responding to telephone calls made for the identified reason include knowledge of the selected representative of that item, and wherein some or all of the identified offers are for other items related to that item.

7. The method of claim 1 wherein the customer placing one of the incoming telephone calls is a potential customer, wherein the identified reason for that telephone call relates to a potential purchased by the customer of an item from the business, wherein the capabilities of the selected representative for responding to telephone calls made for the identified reason include knowledge of the selected representative of that item, and wherein some or all of the identified offers are related to that item.

8. A computer-implemented method for responding to a received communication in a manner based on an assessment of an initiator of the communication, the method comprising:

receiving a communication to an organization; and
automatically responding by,
assessing one or more aspects of an initiator of the received communication that are relevant to the organization;
selecting one of multiple representatives of the organization to respond to the received communication based at least in part on the assessed aspects of the communication initiator and on capabilities of the selected representative; and
providing a notification to the selected representative of the received communication, wherein the notification includes a visual indication of at least one of the assessed aspects of the communication initiator.

9. The method of claim 8 wherein the assessing of the aspects of the communication initiator includes assessing one or more indications of a value of the communication initiator to the organization.

10. The method of claim 8 wherein the assessed aspects of the communication initiator include one or more of an assessed churn score, an assessed up-sell score, an assessed future value of the communication initiator to the organization, and an assessed satisfaction score with the organization.

11. The method of claim 8 wherein the initiator of the communication is an existing customer of the organization, and wherein the assessing of the aspects of the customer is based at least in part on stored profile information for the customer and information regarding prior interactions between the customer and the organization.

12. The method of claim 8 wherein the assessing of the aspects of the communication initiator is based on predictive modeling.

13. The method of claim 8 wherein the assessing of the aspects of the communication initiator is based on assessment rules defined for the organization.

14. The method of claim 8 wherein the assessing of the aspects of the communication initiator is performed for an entity that is represented by an individual who initiated the communication.

15. The method of claim 8 including selecting one or more offers to make to the communication initiator based at least in part on the assessed aspects of the communication initiator.

16. The method of claim 15 including providing information to the selected representative regarding the selected offers so that the selected representative can make one or more of those offers to the communication initiator as part of the response.

17. The method of claim 15 wherein the selecting of the offers includes ranking the offers based on a specified criteria.

18. The method of claim 8 wherein the selecting of the representative includes receiving ratings of one or more capabilities of each of one or more of the representatives that are related to effectiveness of those representatives in responding to the received communication, and wherein the selecting of the one representative based at least in part on their capabilities includes using the received capability ratings for the selected representative.

19. The method of claim 8 wherein the capabilities of the selected representative on which the selecting is based include one or more of an amount of experience of the selected representative and an amount of knowledge of the selected representative related to reasons that communications are received.

20. The method of claim 8 including selecting a manner of responding to the received communication, and wherein the selected representative responds to the received communication in the selected manner.

21. The method of claim 8 wherein the received communication is a telephone call from an existing customer related to a previous interaction with the organization, and wherein the selected representative is one of multiple human operators of the organization that provide service to existing customers.

22. The method of claim 8 wherein the selecting of the representative based at least in part on the assessed aspects of the communication initiator and on capabilities of the selected representative is performed in such a manner that a representative having a high ability to effectively respond to a received communication is selected when the initiator of the received communication is assessed as being of high importance to the organization.

23. A computer-readable medium whose contents cause a computing device to respond to a telephone call received from a caller in a manner based on an assessment of the caller, by performing a method comprising:

receiving a telephone call from a caller to an organization; and
automatically responding to the received communication by,
assessing one or more indications of a value to the organization of the caller;

selecting one or more of multiple offers from the organization based at least in part on the assessed value indications for the caller; and notifying a representative of the organization of the selected offers so that the representative can provide at least one of the selected offers to the caller, wherein the notifying includes providing a visual indication of at least one of the assessed indications of the value to the organization.

24. The computer-readable medium of claim 23 wherein the assessed value indications for the caller include one or more of an assessed churn score, an assessed up-sell score, an assessed future value of the caller to the organization, and an assessed satisfaction score with the organization.

25. The computer-readable medium of claim 23 wherein the caller is an existing customer of the organization, and wherein the assessing of the value indications of the customer is based at least in part on stored profile information for the customer and information regarding prior interactions between the customer and the organization.

26. The computer-readable medium of claim 23 wherein the selecting of the offers includes ranking the offers based on a specified criteria.

27. The computer-readable medium of claim 23 wherein the method further includes selecting one of multiple representatives of the organization to respond to the received telephone call based at least in part on the assessed value of the caller and on capabilities of the selected representative.

* * * * *